United States Patent [19]
Tada

[11] Patent Number: 5,073,868
[45] Date of Patent: Dec. 17, 1991

[54] MULTIPLE UNIT IMAGE PROCESSING WITH A DIRECT MODE AND MULTI-MODE COPYING CAPACITY

[75] Inventor: Kaoru Tada, Osaka, Japan

[73] Assignee: Minolta Camera Kabushiki Kaisha, Osaka, Japan

[21] Appl. No.: 693,762

[22] Filed: Apr. 25, 1991

Related U.S. Application Data

[63] Continuation of Ser. No. 290,995, Dec. 28, 1988, abandoned.

[30] Foreign Application Priority Data

Dec. 28, 1987 [JP] Japan .................. 62-333759

[51] Int. Cl.⁵ .............................. G06F 15/62
[52] U.S. Cl. .................................... 395/112
[58] Field of Search ............. 364/518, 519, 900; 358/426, 448, 449, 457; 355/46, 102, 109, 112, 272, 308

[56] References Cited

U.S. PATENT DOCUMENTS

| | | | |
|---|---|---|---|
| 4,658,299 | 4/1987 | Tanaka et al. | 358/401 |
| 4,695,895 | 9/1987 | Nagashima | 358/426 |
| 4,734,786 | 3/1988 | Minakawa et al. | 358/457 X |
| 4,769,852 | 9/1988 | Hashimoto et al. | 358/449 X |
| 4,791,492 | 12/1988 | Nagashima et al. | 358/448 X |
| 4,797,706 | 1/1989 | Sugishima et al. | 358/448 X |

*Primary Examiner*—Gary V. Harkcom
*Assistant Examiner*—Mark A. Zimmerman
*Attorney, Agent, or Firm*—Price, Gess & Ubell

[57] ABSTRACT

A plurality of image input devices and a plurality of image output devices are connected to a system bus and an image bus of an image processing system through an external device control unit. In response to an instruction supplied, the image input devices and the image output devices are directly connected with each other through the external device control unit without the intermediary of the image processing system, whereby inputted data can be processed. When the instruction includes an instruction indicating that the number of outputs from the image output devices is plural, the inputted image data is temporarily stored in an image memory of the image processing system. A plurality of outputs of image data are obtained from the image output devices based on the stored image data. Consequently, if the image input device is an image reader for example, scanning of the document is required only once even in a multicopy mode.

4 Claims, 6 Drawing Sheets

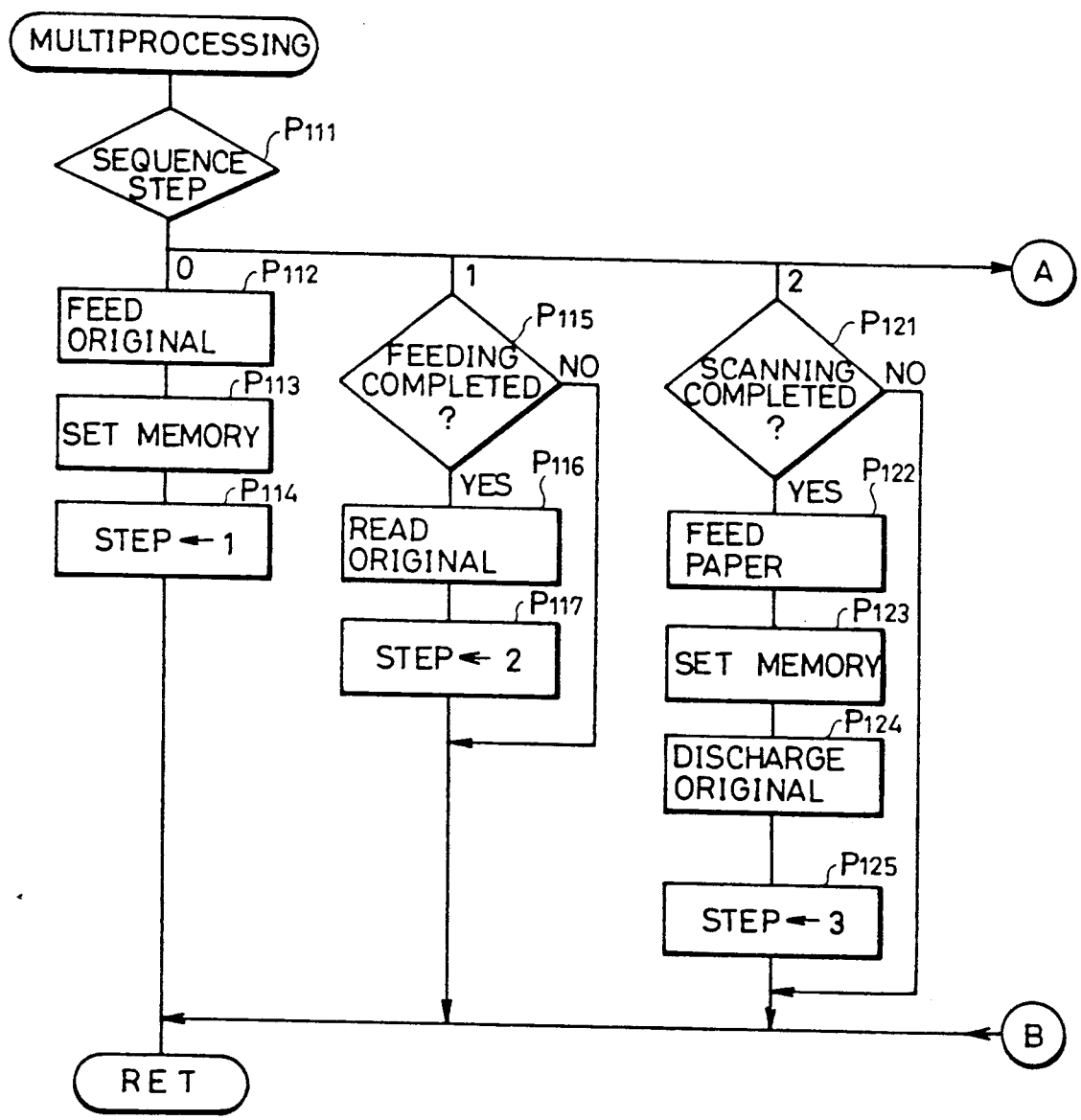

MULTIPLE UNIT IMAGE PROCESSING WITH A DIRECT MODE AND MULTI-MODE COPYING CAPACITY

This is a continuation of application Ser. No. 290,995, filed on Dec. 29, 1988, for an EXTERNAL IMAGE INPUT/OUTPUT DEVICE CONNECTABLE IMAGE PROCESSING SYSTEM, now abandoned.

A related, copending application is U.S. Ser. No. 181,817 entitled "External Image Input/Output Device Connectable Image Processing System", filed Apr. 15, 1988, now abandoned.

BACKGROUND OF THE INVENTION

1. Field of the Invention

The present invention relates to an image processing system to which external image input/output devices are to be connected and, more specifically, it relates to input/output control of image data between the system and the external input/output devices or between the respective external input/output devices.

2. Description of the Background Art

Some image processing systems are connected to a plurality of external image input/output devices. The external devices comprise, for example, an image reader (a scanner) for reading original document images, a microscanner for reading images or microfilms, a laser printer for printing out the images, and a laser filmer for forming the images on a microfilm by means of the laser.

An image processing system such as disclosed in U.S. Pat. No. 4,658,299 comprises an image input unit, an image output unit, an image processing unit and an operation unit for instructing the image processing, wherein the image input unit can be activated both from the image input unit and the operation unit. However, when each of the external devices is to be connected in such image processing system to other external image input/output devices, the image bus which is employed for the communication of the image data can be controlled only by the control means controlling the image processing unit. Therefore, in the prior art, the instructions for connecting the input/output devices are applied from the operation unit which instructs the image processing, and the control means controlling the image processing unit controls the image bus which connects the input/output devices according to the instructions from the operation unit, thereby connecting the instructed devices.

However, in this system, the control means in the image processing unit has to monitor external image input/output devices at all times, which is a heavy burden in processing.

Under the circumstances, the assignee of the present application proposed an image data input/output control unit where external input/output devices can be connected with each other from the side of the external input device (as indicated in the above mentioned related application entitled "External Image Input/Output Device Connectable Image Processing System"). In such image processing system, if an image reader and a laser printer for example are combined in a local (direct) mode, the combined unit can be operated as a digital copier.

If the combined unit as the digital copier is used, scanning by the image reader is required for the number of copies in a multimode where a plurality of copies are to be obtained from one original sheet.

SUMMARY OF THE INVENTION

An object of the present invention is to efficiently process image data in an image processing system capable of operating external input/output devices in a direct mode.

Another object of the present invention is to provide a plurality of outputs of image data from external output devices at high speed in an image processing system capable of operating external input devices in a direct mode.

Still another object of the present invention is to process the most preferable image data at the time of providing a plurality of outputs of image data from the external output devices, in an image processing system capable of operating external input/output devices in a direct mode.

In order to attain the above described objects, an image processing system according to the present invention comprises an image processing section, external image input means, external image output means, and connection control means. The image processing section comprises a data processing unit for processing image data, and an image memory for storing the image data. The external image input means inputs image data. The external image output means outputs image data corresponding to the inputted image data. The connection control means controls connections among the external image input means, the external image output means and the image memory so as to shorten the time required for the inputted image data to be outputted corresponding to the number of outputs from the external image output means.

In order to attain the above described objects, the image processing system according to an aspect of the invention comprises an image processing section, external image input means, external image output means, mode setting means, output number designating means, determining means, and control means. The image processing section includes a data processing unit for processing image data and an image memory for storing the image data. The external image input means inputs image data. The external image output means outputs image data corresponding to the inputted image data. The connection control means controls connection of the external image input means, the external image output means and the image memory, to shorten a period required for the inputted image data to be outputted according to the number of outputs from the external image output means.

The image processing system thus structured controls connections among the external image input means, the external image output means and the image memory of the image processing section so as to output inputted image data for as short a period as possible and thus the system can process image data efficiently.

According to the aspect of the invention, the image processing system thus structured stores inputted image data temporarily in the image memory when a plurality of outputs of image data are designated, and enables the external image output means based on the stored data. Thus, image data can be outputted at high speed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 9A and 9B show a flow chart showing the details of the multiprocessing in FIG. 8.

DESCRIPTION OF THE PREFERRED EMBODIMENTS

An embodiment of the present invention will be described in the following with reference to the drawings.

A. Structure of Image Processing System

Figure 1:
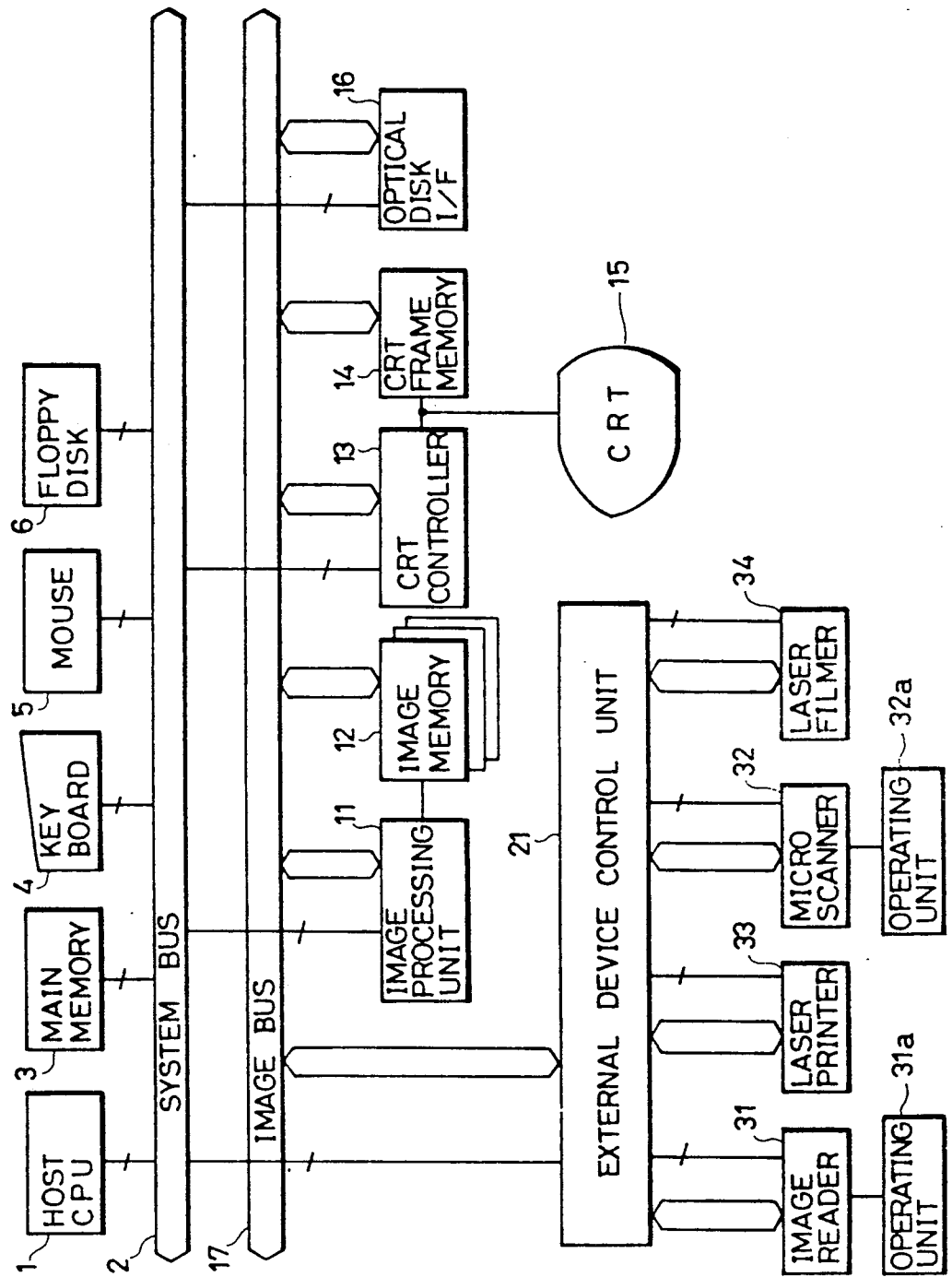
FIG. 1 is a block diagram of an image processing system according to an embodiment of the present invention, showing connections among the respective devices.

FIG. 1 is a block diagram showing an image processing system according to an embodiment of the invention. A host CPU 1 controlling the present system is connected to a main memory 3 for storing programs and the like, a keyboard 4 and a mouse 5 for inputting instructions and data, a floppy disk device (or a hard disk device) which is an auxiliary memory device, an image processing unit 11, a CRT controller 13, an optical disk interface 16 and to an external device control unit 21 through a system bus 2. The host CPU 1 carries out total management of the system, management of documents, management of optical disks, image processing, man-machine interface processing, and so on using the programs in the main memory 3. The CRT controller 13 displays on the CRT 15 an image, icon of menu selections stored in the CRT frame memory 14, parameters for various processing operations, entered or retrieved data, and so on based on the instructions from the host CPU 1. An operator proceeds with the operation by using the icon displayed on the CRT 15 and the key input of the keyboard 4 or selection buttons of the mouse 5. The image processing unit 11 carries out setting of an image storing region of an image memory 12 and image editing such as expansion/reduction, movement, rotation and inversion based on the instructions from the host CPU 1 and stores the resulting image data in the image memory 12. The optical disk interface 16 is an interface employed for controlling the optical disk, and for compressing, restoring and recording image data. The host CPU 1 is further connected to external devices 31 to 34 which are various external input/output devices, through the external device control unit 21 which will be described later.

The image processing unit 11, image memory 12, CRT controller 13, CRT frame memory 14, optical disk interface 16 and external device control unit 21 are respectively connected to an image bus 17 for image data communication and are capable of inputting/outputting image data with each other. The external devices 31 to 34 are connected to the image bus 17 not directly but through the external device control unit 21.

The external device control unit 21 is connected t the system bus 2 and the image bus 17 on the side of the system body. Meanwhile, an image reader (DS) 31 and a microscanner (MS) 32 which are external image input devices having operation units 31a and 32a, respectively, and a laser printer (LP) 33 and a laser filmer (LF) 34 which are externally image output devices are respectively connected to the external device control unit 21. The image reader 31 comprises an automatic document feeder for automatically handling originals. The connection control of the image bus 17 through the external device control unit 21 and the control of the image output device through the system bus 12 can be carried out from these external image input devices.

Figure 2:
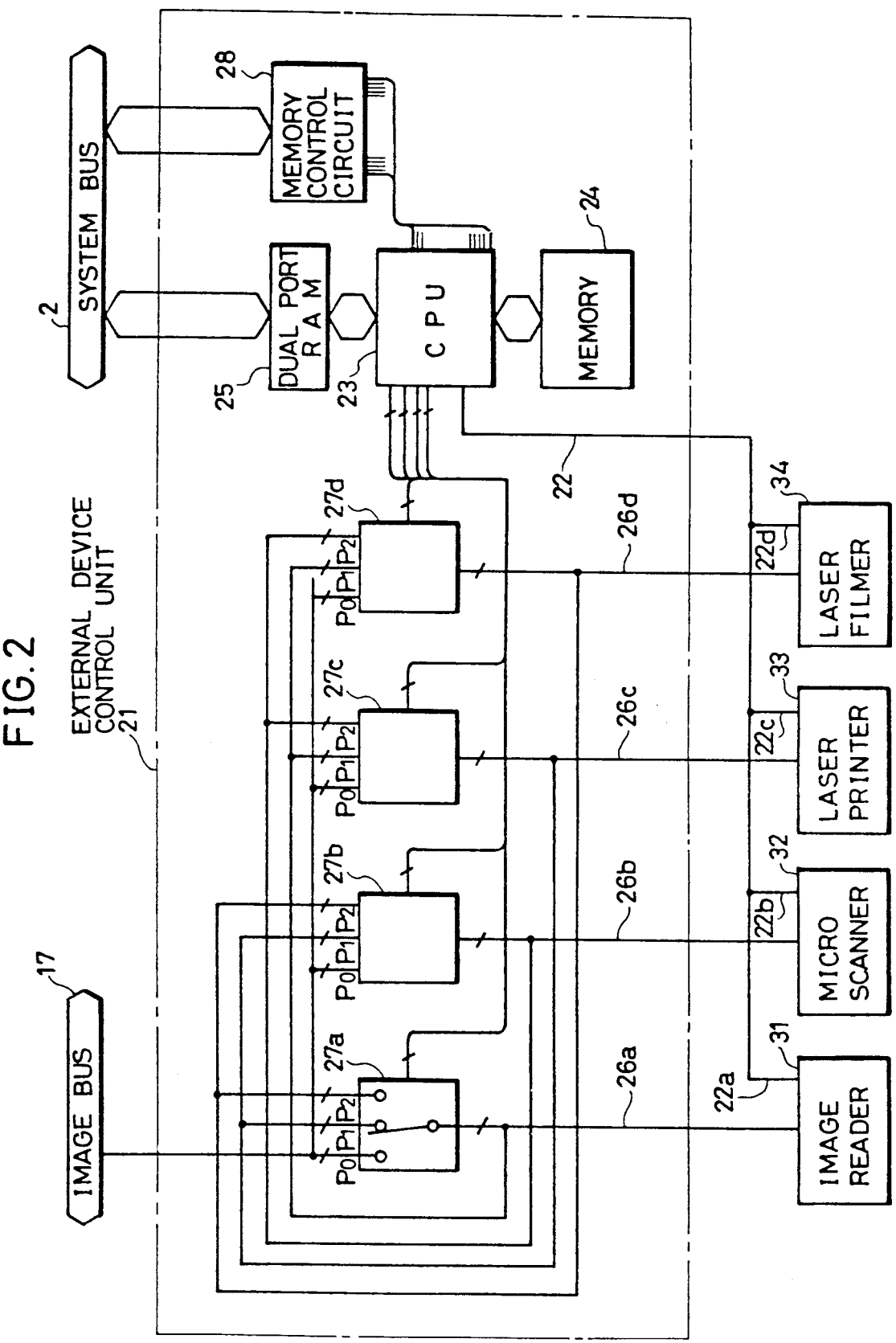
FIG. 2 is a block diagram centered on the internals of the external device control unit in the above mentioned embodiment showing the internal structure and the connections of the peripheral devices.

FIG. 2 is a block diagram of the external device control unit 21. The external image input/output devices 31 to 34 are connected to a CPU 23 through the control command lines 22a, 22b, 22c and 22d, respectively, and through a control command line 22 which is commonly connected thereto, for transmitting and receiving the control command. More specifically, the exchange of activating commands such as scanning by the image reader 31 and printing by the laser printer 33, of mode setting commands such as expansion/reduction, exposure and paper size selection of the image reader 31, and of the information such as the device status and on/off conditions of the keyboard is effected through the control command lines 22a to 22d. The information for communication is stored in the memory 24 which is connected to the CPU 23. Meanwhile, the CPU 23 is connected to the dual port RAM 25 for communication with the host CPU 1 through the system bus 2, and exchanges information including the control command with the host CPU 1.

The external image input/output devices 31 to 34 are connected to the image data lines 26a to 26d and to the switches 27a to 27d, respectively, for switching connection between each of the devices 31 to 34 and the image bus 17, and transmit and receive image data. The CPU 23 switches the connections of the tri-state switches 27a to 27d based on the control command. The connections of the switches 27a to 27d are arranged so as to enable various combinations of the input/output devices. Table 1 shows combinations of the connections of the switches 27a to 27d. A memory control circuit 28 connected to the CPU 23 and to the system bus 2 controls the image bus 17, sets and activates the count of the memory 24 when data is communicated from the memory 24 to an output device and from an input device to the memory 24. The memory 24 is provided with a receiving buffer, a transmitting buffer and a communication table (a table of commands from the host CPU 1 and the input/output devices 31 to 34) for storing information communicated and it stores various commands.

TABLE 1

| Switch Control of External Device Control Unit | | | | |
|---|---|---|---|---|
| | Switch | | | |
| Image bus | 27a (DS) | 27b (MS) | 27c (LP) | 27d (LF) |
| DS ⟶ Memory | P0 | $\overline{P0}$ | $\overline{P0}$ | $\overline{P0}$ |
| MS ⟶ Memory | $\overline{P0}$ | P0 | $\overline{P0}$ | $\overline{P0}$ |
| Memory ⟶ LP | $\overline{P0}$ | $\overline{P0}$ | P0 | $\overline{P0}$ |
| Memory ⟶ LF | $\overline{P0}$ | $\overline{P0}$ | $\overline{P0}$ | P0 |
| DS ⟶ LP | P1 | $\overline{P1}$ | P1 | $\overline{P1}$ |
| MS ⟶ LP | $\overline{P1}$ | P1 | $\overline{P1}$ | P1 |
| DS ⟶ LF | P2 | $\overline{P2}$ | P2 | $\overline{P2}$ |
| MS ⟶ LF | $\overline{P2}$ | P2 | $\overline{P2}$ | P2 |

<Notes>
DS: image reader
MS: microscanner
LP: laser printer
LF: laser filmer $\overline{P0}$: other than P0, $\overline{P1}$: other than P1, $\overline{P2}$: other than P2

The CPU 23 carries out the control command communication, the control of the image line, transmission/reception of the information to and from the host CPU 1, the control of the memory control circuit 28, and so on described in the foregoing. For example, the CPU 23 determines whether the copy request indicates the multimode or not, or whether a free area exists in the image memory 12 or not and it carries out sequence control of the image reader 31, the laser printer 33 and the image memory 12.

As described above, the image bus 17 on the side of the system body can be directly connected to the image data lines 26a to 26d of the external input/output devices. Meanwhile, the external input/output devices can be directly connected to each other, not through the image bus 17 (in the local mode). More specifically, in this system, the respective external devices can be connected not only to the image processing unit in one to one correspondence but also directly with each other. For example, the image reader and the laser printer can be connected directly with each other so as to be used as a digital copier and the microscanner and the laser printer can be directly connected with each other so as to be used as a digital reader printer. In this case, the host CPU 1 can be dedicated to the control of the system body, in addition to monitoring of the dual port RAM 25.

B. Operation of Digital Copier in the Local Mode

Description is made of operation in the case of using a digital copier (formed by the image reader 31, the laser printer 33 and the operation unit 31a) connected to the present image processing system in the local mode.

Let us assume a case in which a copy request (through operation of a print button) is issued from the operation unit 31a which is one of the external input/output devices. At the same time, the copy mode concerning the number of copies, the paper size, the resolution and the like is communicated to the external device control unit 21.

When the CPU 23 of the external device control unit 21 receives the copy request, it determines based on the conditions of the image reader 31 and the laser printer 33 whether the operation is permitted or not. If the copy operation is permitted and if the number of copies is a plural number (in the multimode), the CPU 23 communicates information through the system bus 2 as to whether a free area corresponding to a capacity of data calculated based on the paper size and the resolution exists in the image memory 12. If it exists, copy sequence control is carried out in a memory mode in which image data flows in the course of the image reader 31, the image memory 12 and the laser printer 33. Thus, the external device control unit 21 connects the data bus 26a and the image bus 17 between the image reader 31 and the image memory 12. The image reader 31 reads an image of an original in the copy mode set from the operation portion 31a of the image reader 31 into the image memory 12. Then, the external device control unit 21 switches the data bus 26c between the image memory 12 and the laser printer 33, so that the laser printer 33 prints the image data from the image memory 12 by the predetermined number of sheets. In this case, since the image reader 31 needs to effect scanning only once even in the multimode, copy operation can be carried out at high speed. After the completion of the predetermined number of copies, the copy sequence control is terminated.

In the case of a single copy (a single mode), or in the case in which the CPU 23 of the external device control unit 21 determines that there is no free area in the image memory 12 in the multimode, the external device control unit 21 connects the data lines 26a and 26c between the image reader 31 and the laser printer 33 and thus effects copy operation in the direct mode of the image reader 31 and the laser print 33.

In the present embodiment, the external device control unit 21 carries out the sequence control dependent on whether the number of copies is a single number or a plural number. However, if it is determined that copy operation cannot be carried out at high speed in the memory mode although the number of copies is a plural number but a small number, the control may be effected in the direct mode in the same manner as in the case of a single copy.

C. Flow of Control of the External Device Control Unit 21

Figure 3:
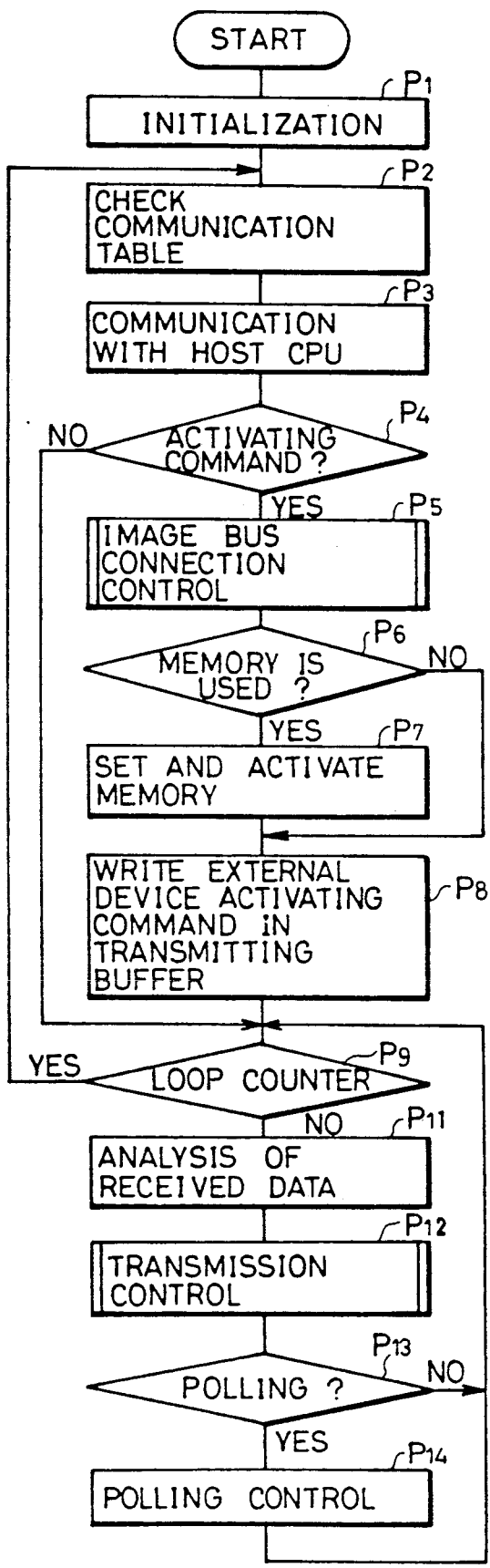
FIG. 3 shows a main flow of the CPU controlling the external device control unit in the embodiment.

FIG. 3 shows the main flow of the CPU controlling the external device control unit 21. Initialization is effected at first, that is, initialization for interruption, ports and serial communication in the CPU 23, initialization of peripheral circuits and communication permission for the peripheral circuits are carried out (in step P1).

Then, a communication table (a table of commands from the external input devices and the like) in a working area of the memory 24 is checked (in step P2). Subsequently, the CPU 23 communicates with the host CPU 1 corresponding to the control commands stored and it receives control commands from the host CPU 1 and writes the same in the communication table of the memory 24 (in step P3).

If an activating command for activating the external devices is given (in step P4), the status of the external devices to be activated is checked and connection of the image lines is controlled (in step P5). In the case of using the memory 24 (in step P6), parameters for the external devices are set in the memory 24 (in step P7). Then, the external device activating command is written in the transmission buffer of the memory 24 (in step P8). If it is determined in step P4 that there is no activating command, the above described procedures are not executed.

Thereafter, the value of the loop counter provided for periodical communication on the status with the external devices is checked (in step P9). If the value of the counter reaches a predetermined value, that is, for each loop of the predetermined number, the flow returns to step P2.

Figure 4:
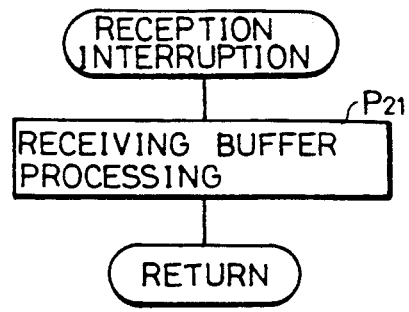
FIG. 4 shows a flow of a reception interrupting routine in association with the main flow of the CPU in the embodiment.

If the number of the loop counter does not reach the predetermined value, external control is effected. More specifically, the received data written in the receiving buffer in a reception interrupting routine (as shown in FIG. 4) is analyzed and the contents are written in the communication table (in step P11). Then, the communication table map is scanned and the status of each device is monitored, whereby it is determined whether there is any data to be transmitted. If there is any such data, it is written in the transmitting buffer (in step P12). Thereafter, it is determined whether a request command which requests status periodically from the external devices is to be outputted or not (in step P13). More specifically, if an answer for the previous request is given (in the case of YES in step P13), the request command is written in the transmitting buffer (in step P14). Then, the flow returns to step P9.

FIG. 4 shows a reception interrupting routine which appropriately enters the main flow of FIG. 3.

When the reception interruption enters from the serial communication ports of the CPU 23, the data is written in the receiving buffer (in step P21).

Figure 5:
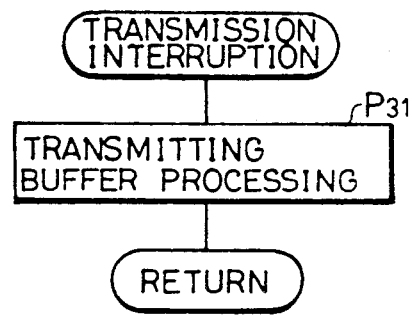
FIG. 5 shows a flow of a transmission interrupting routine in association with the main flow of the CPU in the embodiment.

FIG. 5 is a transmission interrupting routine which appropriately enters the main routine of FIG. 3.

When the interruption of transmission data empty enters the CPU 23, whether there is any data to be transmitted to the transmitting buffer or not is checked. If there is any such data, the data is outputted to the serial communication port. If there is no data, the transmission interruption is masked (in step P31).

Figure 6:
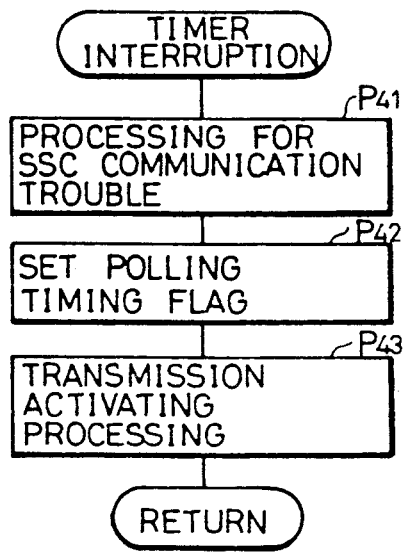
FIG. 6 shows a flow of a timer interrupting routine in association with the main flow of the CPU in the embodiment.

FIG. 6 is a timer interrupting routine which appropriately enters the main routine of FIG. 3.

It is determined by the timer count whether an answer to a request is given in a prescribed period after the transmission of the request command (in step P41). If there is no answer given, a flag for polling control determination is set (in step P42). Then, the transmitting buffer is checked. If there is any data to be transmitted in that transmitting buffer, the data is outputted to the serial communication port and the transmission interruption is enabled (in step P43).

Figure 7:
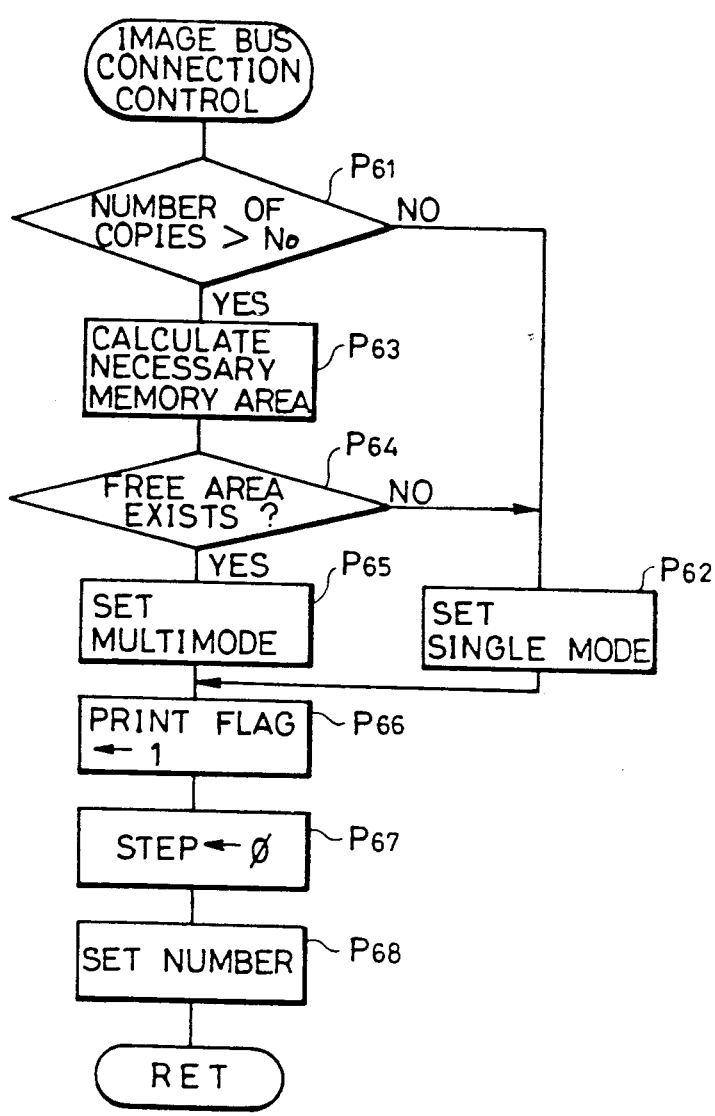
FIG. 7 shows a flow of image bus connection control which is a subroutine of the main flow of the CPU in the embodiment.

FIG. 7 shows a processing routine for image bus connection control (step P5 in FIG. 3) in the case in which the activating command (step P4 in FIG. 3) is a copy request (that is, the print button is pressed). First, it is determined whether the set number N of copies is larger than a predetermined number No or not (in step P61). The number No is the smallest number of copies which can be obtained at high speed by using the image memory 12 and, in this embodiment, the number No is 1. If the condition N>1 is not satisfied, the single mode is set (in step P62). In the case of N>1 (the multimode), a necessary memory space (the number of bytes) is calculated based on the read size, the density for reading and the like (in step P63). Then, if a necessary free area exists in the image memory 12 (in the case of YES in step P64), the multimode is set (in step P65). If there is not any free area, the single mode is set (in step P62).

Then, the print flag indicating that copy operation is being done is set (in step P66) and the copy sequence control step is set to the initial state (in step P67), and the number of sheets to be printed is set (in step P68).

Figure 8:
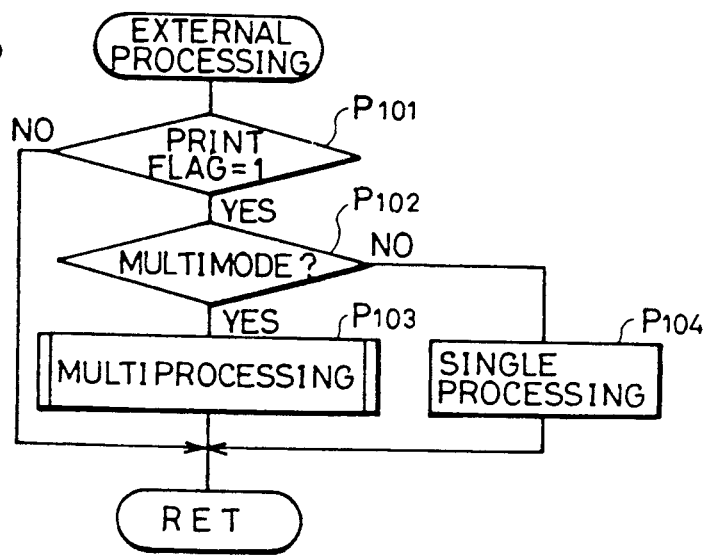
FIG. 8 shows an external processing routine related with copy operation in the transmission control routines of the main flow of the CPU in the embodiment.

FIG. 8 shows an external processing routine related with copy operation in the transmission control (step P12) in FIG. 3. First, it is determined whether the print flag indicating that the image input/output sequence is being executed is set or not (in step P101). If it is not set, the flow returns.

If the print flag is set, and if the multimode is set (in the case of YES in step P102), multiprocessing (in step P103) is carried out. If the multimode is not set (in the case of NO in step P102), single processing (step P104) is executed.

Figure 9B:
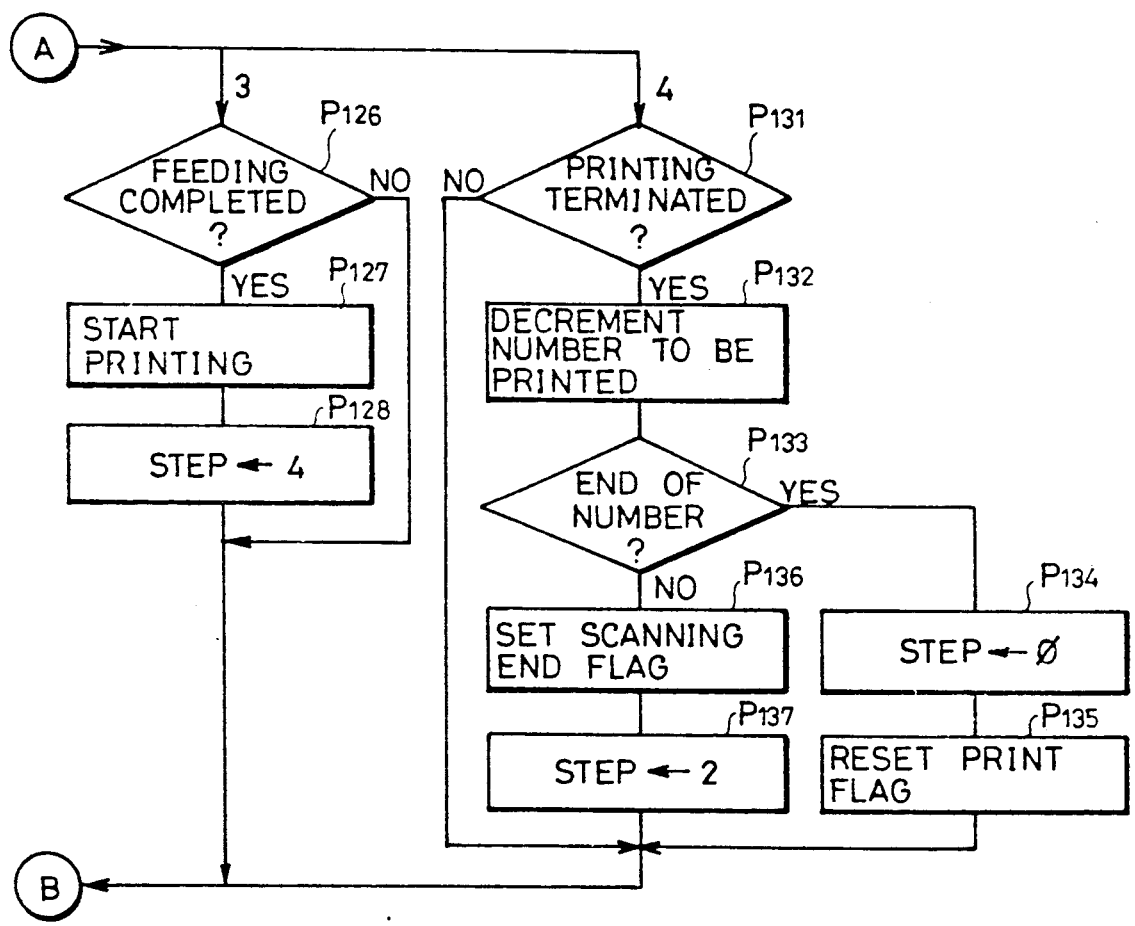

FIGS. 9A and 9B show a flow of the multiprocessing (step P103 in FIG. 8). Branching is effected according to the sequence step (in step P111) and control of the operation of the image reader 31 or the laser printer 33 setting of the memory 12 and control of the number of sheets to be printed are effected.

If the sequence step is 0, a document feeding command is transmitted to the automatic document feeder (in step P112). Then, the image memory 12 is connected to the image reader 31 (in step P113) so that preparation is made for reception of image data. Subsequently, the sequence step is set to 1 (in step P114).

If the sequence step is 1, there is a wait for completion of the feeding of the document feeder (YES in step P115) and the document reading request command is transmitted (in step P116). Then, the sequence step is set to 2 (in step P117).

If the sequence step is 2, there is a wait for completion of the scanning (YES in step P121) and then a printer paper feed command is transmitted (in step P122) and the image memory 12 is connected to the laser printer 33 (in step P123), whereby preparation is made for output of the image data. Subsequently, a document discharge command is transmitted to the document feeder (in step P124). Finally, the sequence step is set to 3 (in step P125).

If the sequence step is 3, a printing start command is transmitted (in step P127) after completion of the feeding of the printer paper (in step P126) and then the sequence step is set to 4 (in step P128).

If the sequence step is 4, the number of sheets to be printed is decremented by one (in step P132) after completion of the printing of the printer (YES in step P131). Then, if the number of sheets to be printed comes to an end (in the case of YES in step P133), the sequence step is set to 0 (in step P134) and the print flag is reset (in step P135). If the printing is being done (in the case of NO in step P133), a scanning end flag is set (in step P136) and the sequence step is set to 2 (in step P137), whereby the same image data is copied again.

As described in the foregoing, according to the present invention, the combination of the image reader and the laser printer connected can be effectively utilized as a local digital copier. If a plural number of copies are to be obtained, image data is temporarily stored in the image storing means in the image processing unit and the plural number of sheets are printed based on the stored image data, whereby the plural number of copies can be obtained at high speed.

In addition, the number of scanning operations of the image reader is reduced, which makes it possible to increase the life of the image reader and to reduce consumption of electric power in the image reader.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing system comprising:

an image processing section including a data processing unit for processing image data and an image memory for storing image data;

an external image input device for inputting image data;

an external image output device for outputting copies of image data;

a connection unit for connecting the external image input device and the external image output device to the image processing section, said connection unit being capable of providing direct connection between the external image input device and the external image output device;

mode setting means for defining a direct mode which enables the direct connection between the external image input device and the external image output device not through the image processing section;

entering means for entering a number of copies of image data;

connection control means for controlling the connection unit to connect the external image input device and the external image output device in either a first manner wherein the external image input device is directly connected to the external image output device so that the image data input by the external image input device is directly transferred to the external image output device to output copies of the image or a second manner wherein the external image input device is connected to the external image output device through the image memory so that the image data input by the external image input device is once stored in the image memory and the image data stored in the image memory is transferred to the external image output device to provide the number of copies of the image data entered by the entering means; and determining means, when the direct mode is defined by the mode setting means and a plural number of copies are entered by the entering means, for determining which manner of the first and second manners can provide copies of the image data in a shorter period of time and for causing the connection control means to control connection of the external image input device and the external image output device in the manner determined to provide copies in the shorter period of time.

2. An image processing system as claimed in claim 1, wherein determination of the determining means is conducted by referring to the number of copies entered by the entering means.

3. An image processing system as claimed in claim 2, wherein the number of copies is greater than one.

4. In an improved information system for providing copies of image data stored in a memory and having a plurality of image input devices and a plurality of image output devices connected by a system bus and an image bus of an image processing system the improvement comprising:

an external device control unit connected to each of the image input devices and image output devices and also to the system bus and the image bus, the control unit including a memory unit to store status commands of the image input and output devices;

means for entering the number of copies by an operator;

means for automatically comparing the number of copies entered by the operator with a predetermined number stored;

means for automatically and directly connecting an image input device with an image output device, independent of the control of the image processing system for providing an image data copy when the means for comparing indicates that the predetermined number is greater than the operator number entered and the status commands stored in the memory unit indicate the availability of connecting a specific image input device with an image output device, and means for automatically connecting the image output device to the image data stored in the memory through the image processing system when the predetermined number is equal to or lesser than the number entered whereby the image output devices can provide the number of copies entered by the operator through the image processing section.

* * * * *